Feb. 27, 1968  E. W. HINES  3,370,538
FLUID PUMPS ENERGIZED BY MAGNETOSTRICTIVE ACTION
Filed Feb. 11, 1966

INVENTOR
EUGENE W. HINES

BY
ATTORNEY

Feb. 27, 1968   E. W. HINES   3,370,538
FLUID PUMPS ENERGIZED BY MAGNETOSTRICTIVE ACTION
Filed Feb. 11, 1966   2 Sheets-Sheet 2

INVENTOR
EUGENE W. HINES

BY
ATTORNEY

United States Patent Office 3,370,538
Patented Feb. 27, 1968

3,370,538
FLUID PUMPS ENERGIZED BY MAGNETO-
STRICTIVE ACTION
Eugene W. Hines, Grand Blanc, Mich., assignor to
E. W. Hines and Associates
Filed Feb. 11, 1966, Ser. No. 526,815
3 Claims. (Cl. 103—1)

This invention relates to fluid pumps which are electrically powered and which utilize the magnetostrictive effect to convert the electrical input power into a motion which drives the fluid and more particularly to such devices which utilize magnetostricting members formed of two metallic parts having different coefficients of magnetostrictive expansion laminated together in such a manner as to provide a relatively large motion of the member in response to variations in applied magnetic fields.

The magnetostrictive phenomenon consists of variations which occur in the dimensions of ferromagnetic materials when they are placed in a magnetic field. For example when an iron rod is subjected to a gradually increasing longitudinal magnetic field, it at first increases slightly in length and later the length diminishes; when the magnetic intensity has reached about 250 oersteds, the rod has returned to its original length and further increase of intensity causes it to contract. Nickel contracts rapidly at first and then remains nearly constant while some iron-nickel alloys lengthen without reversal. Previous attempts have been made to utilize this phenomenon to convert electrical energy into an output motion, but the application of such devices has been seriously limited by the relatively small dimensional changes which occur. For a nickel rod one foot long, for instance, the change at saturation would be about 3.6 ten thousandths of an inch.

The present invention has as its primary object to provide magnetostrictive devices for converting electrical energy into output motion wherein the length of the output motion is substantially larger than that which may be achieved by normal magnetostrictive devices. These exaggerated effects are achieved by utilizing ferromagnetic devices formed of two elongated sections of two materials having differing coefficients of magnetostrictive dimensional change laminated to one another so as to provide a magnified output motion when subjected to variations in an applied magnetic field. For example, one of the embodiments of the invention disclosed in the following detailed description employs a diaphragm formed of two circular sheets, one of iron and the other of nickel. When a proper magnetic field is applied to this diaphragm either transversely to its plane or longitudinally with its plane, the resultant dimensional changes of the two materials are such as to provide a force concentration at the boundry between the two sheets which causes the diaphragm to spring to a new position in the manner of a bi-metal temperature sensing device. Another embodiment of the invention utilizes a pair of elongated strips laminated together and supported at one end so that the opposite end undergoes an amplified motion as the applied magnetic field is varied.

It is an object of the present invention to apply such laminated magnetostrictive structures as operating mechanisms in fluid pumps of the diaphragm and/or bellows variety, wherein a compartment is bounded on one side by a member which reciprocates in position so as to alternately expand and contract the volume of the compartment. Inlet and outlet ports draw fluid into the compartment as its volume expands and expel fluid from the compartment as its volume decreases, providing a pumping action. In one of the following embodiments of the invention, the magnetostrictive diaphragm forms one wall of the pump compartment and a magnetic coil surrounds the pump so that its magnetic field passes through the diaphragm. As the current to the coil is varied, the diaphragm undergoes dimensional changes that cause it to vary the volume of the fluid compartment and to provide a pumping action. In another embodiment of the invention, the pumping compartment is bounded by a bellows-like arrangement formed of magnetostrictive material. When the magnetic field applied to the bellows varies, it expands or contracts and thereby expels fluid. In still another embodiment, the wall of the fluid chamber is not magnetostrictive itself, but is actuated by a magnetostrictive member formed of a laminated structure, which applies its output motion to a flexible wall of the compartment.

By controlling the application of power to the coils of the devices of the present invention, varying output effects may be achieved. For example, if electrical pulses are applied to the coils of one of the devices, corresponding pulses of fluid will be generated by the pump and it will act as a direct digital actuator. If alternating current is applied to the coils, the frequency of the current will be directly related to the pumping volume. This arrangement is useful in an automotive vehicle using an alternator powered electrical system. Since the frequency of the applied alternating current varies with the speed of the engine the output of the fluid pump will similarly vary and will provide approximately the amount of fuel required by the engine.

It is therefore seen to be a primary object of the present invention to provide pumping devices having a compartment of variable dimensions and having means connected to pump fluid as the compartment volume changes, in which the volume of the compartment is varied by means of the motion produced by imposing a variable intensity magnetic field on a laminated structure formed of two materials having differing coefficients of magnetostrictive dimensional change.

Another object is to provide such a pump wherein the laminated structure itself forms one of the boundaries of the compartment.

Another object is to provide such a pump wherein the laminated structure takes the form of a diaphragm, supported on its outer edge and having two positions of rest, wherein the diaphragm oscillates between two positions in response to an alternating magnetic field applied to a surrounding core.

A still further object is to provide such a pump which is connected with a source of electric power of alternating frequencies so as to provide an output volume which is a function of the frequency of the applied current.

Other objects, advantages and applications of the present invention will be made apparent by the following detailed description of several embodiments of the invention. The description makes reference to the accompanying drawings in which.

Figure 3:
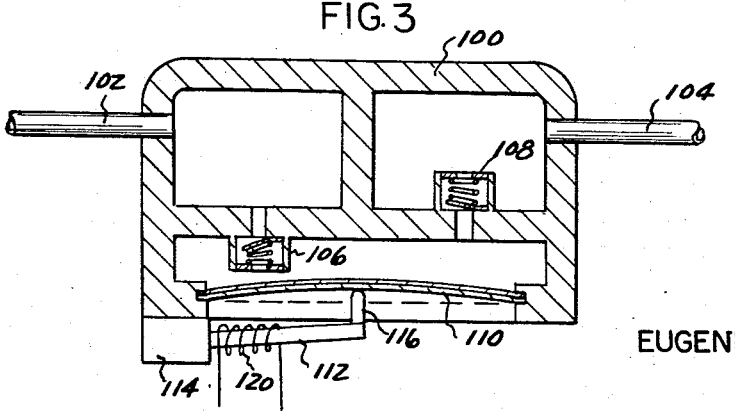
Figure 4:
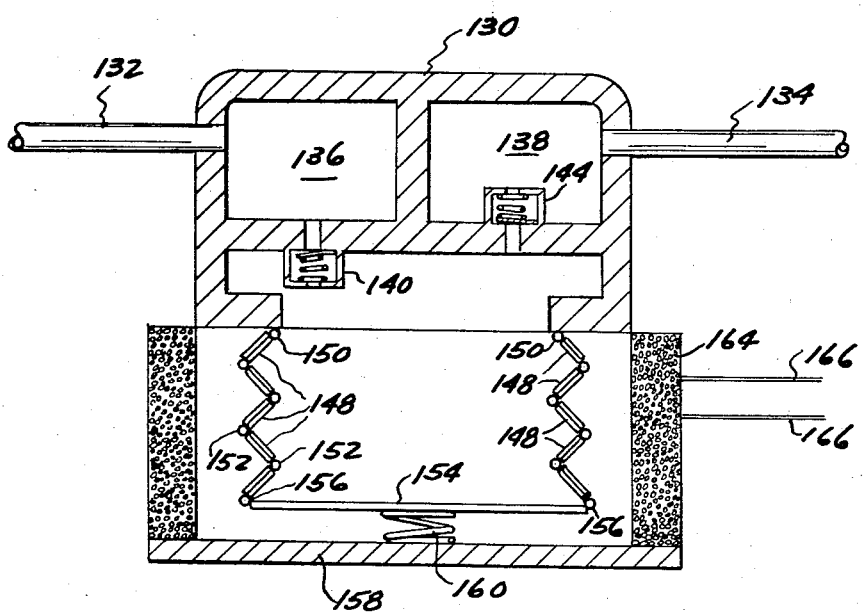

FIGURE 3 is a sectional view through a third embodiment of the invention wherein a pump having a cylindrical diaphragm is actuated by a magnetostrictive laminated structure anchored to the pump base and having one end abutting the diaphragm; and FIGURE 4 is a sectional view through a third embodiment of the invention wherein the variable volume pumping compartment is formed by a bellows arrangement with elements of the bellows being formed of a magnetostrictive laminated structure so that the bellows expands and contracts in response to applied variations in the magnetic field.

Figure 1:
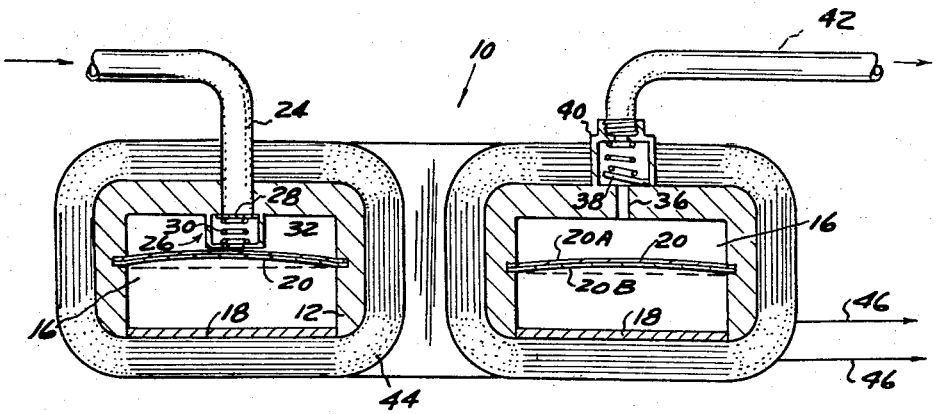
FIGURE 1 is a sectional view through a first embodiment of the invention which takes the form of a pump having an annular chamber which is bounded upon one side by a laminated diaphragm.

Referring to FIGURE 1, which represents a section taken along a plane parallel to the central axis of a toroidal pump, generally indicated at 10, the pump is formed about a toroidal housing 12 which has a central cavity 14. The housing 12 may be formed of metal or plastic and may surround a hollow annular chamber 16. The plastic annulus 12 bounds the compartment on three sides. The fourth side is enclosed by a plastic plate 18 which is fitted to the lower inner corners of the annulus 12. The annulus is bisected, along a horizontal line, as viewed in FIGURE 1, by an annular diaphragm 20 which has its edges retained in the opposed sidewalls of the volume 16 so as to divide the volume into an upper and lower compartment.

The diaphragm 20 is formed of two sheets 20a and 20b which are laminated together. In the preferred embodiment, one of the sheets is formed of iron and the other sheet of nickel. Other combinations may be employed, but the critical factor is that the sheets be of different materials so as to have differing magnetostrictive responses to a magnetic field which is applied to them in a manner which will be subsequently disclosed. One of the sheets of the lamination might be of a non-ferromagnetic material, but at least one of the sheets must be of a ferromagnetic material.

The volume of the compartment 16 above the diaphragm 20 as viewed in FIGURE 1, will be termed the pumping volume. Two fluid connections are made to this compartment through its top wall. An inlet passage 24 passes through a hole in the top wall and connects to an inlet valve mechanism generally indicated at 26. This consists of a leaf valve 28 which is normally held against the opening of the passage 24 by a spring 30 retained in a cage 32. This valve allows fluid to flow from the conduit 24 into the pumping compartment but prevents fluid flow in the reverse direction.

The other fluid connection to the pumping compartment is formed by a passage 36 which is closed on its upper end by a butterfly valve 38. The valve 38 is normally biased into a position closing off the top of the passage 36 by a spring 38 retained in a cage 40. An outlet line 42 connects to the upper end of the cage. The valve 38 allows fluid flow from the pumping compartment into the outlet conduit 42, but prevents flow in the reverse direction.

The annulus 12 is surrounded by a toroidally wound coil 44 of magnetic wire. The coil is wound in a number of layers and its two ends 46 are connected to an appropriate source of electrical power. When current is applied to the lines 46, the coil 44 generates a magnetic field which passes through the diaphragm 20. Those lines which extend through the plane of the diaphragm are minimal and the greater percentage of the flux field passes through the diaphragm transversely, providing a magnetostrictive effect wherein the iron section 20a tends to shorten and the nickel lamination 20b tends to lengthen. The forces which result at the interface between the two materials from these dimensional changes tend to bow the material in the manner of a bi-metal of the type used in the thermostat into the position illustrated in dotted lines in FIGURE 1 wherein the diaphragm has moved away from the upper end so as to effectively enlarge the volume of the compartment. As the diaphragm moves to this position, the valve 28 is drawn downwardly, and a fluid flow is drawn in through the line 24 into the compartment. When the current applied to the terminal 46 is again varied, in an opposite sense, the diaphragm returns to the position shown in FIGURE 1, contracting the volume of the compartment and causing a fluid flow that opens the valve 38 and passes onto the line 32.

The diaphragm might be supported within the annular housing 14 so that it has two steady state positions, on opposite sides of a median line. In this case, the mechanical snap of the diaphragm would enlarge its motion beyond that which may be achieved by magnetostriction alone.

Figure 2:
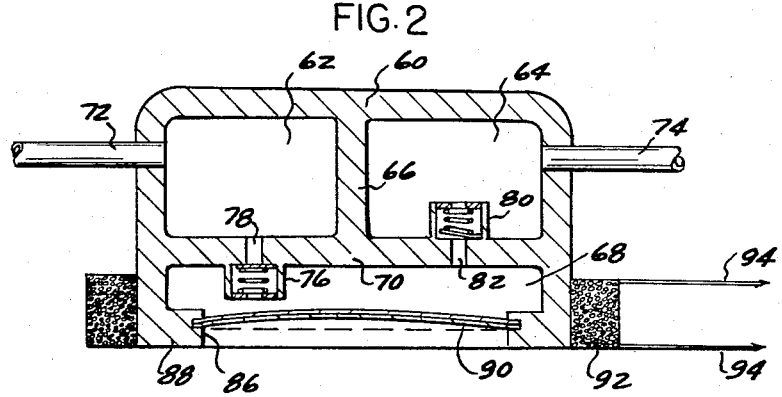
FIGURE 2 is a sectional view through a second embodiment of the invention wherein a cylindrical compartment pump has one of its walls bounded by a circular diaphragm.

A second embodiment of the invention is illustrated in FIGURE 2. It employs a cylindrical housing 60 which has its top divided into a pair of storage chambers 62 and 64 by a separating wall 66, and a bottom pumping compartment 68 separated from the chamber by a wall 70. The wall 70 extends horizontally through the center of the housing 60 and divides it into upper and lower halves. The wall 66 extends vertically across the width of the upper housing half to divide it into the two storage chambers 62 and 64. A fluid inlet line 72 connects the storage chamber 62 to a fuel source and an outlet line 74 provides output from the storage chamber 64 to some fuel destination, such as the carburetor of an internal combustion engine. A unidirectional valve 76 of the same type employed in FIGURE 1 is disposed at one end of a passage 78 which connects the inlet storage chamber 62 with the pumping compartment 68. This valve 76 allows fluid flow only from the storage chamber 62 into the compartment 68 and prevents reverse flow.

Another unidirectional valve 80 connects the outlet storage chambers 64 with the pumping chamber 68 by means of a passage 82. The valve 80 allows fluid flow from the pumping compartment 68 to the storage chamber 64, and through the outlet line 74 to the utilizing device.

An aperture 86 is formed in the lower end of the lower chamber 68, thus forming a circular shoulder 88 which projects inwardly from the lower end of the chamber 68. A laminated circular bi-metal diaphragm 90 formed of the same materials as the diaphragm 20 and is supported across the opening 86 by means of edges contained within the shoulders 88 to close off the lower compartment 68.

Magnetic coil 92 is wound around the bottom of the housing 60, so as to surround the diaphragm 90. Current is applied to the coil 92 through leads 94.

When current is applied to the coil 92 magnetic field is generated which has extensive components passing through the diaphragm 90. This flux creates a magnetostrictive dimensional variation in both of the laminations of the diaphragm which tend to move the diaphragm in the direction of the wall 70 thereby diminishing the volume of the chamber. Again, the diaphragm 90 could be supported in the edges of the shoulder 88 in such a manner that it has two stable states and the application and removal of the magnetic forces could cause it to vibrate between the states. In such an embodiment, the movement of the diaphragm is independent of the magnitude of the applied magnetic forces as long as they are about the threshold value, so that the output of the pump, per stroke, is constant. Such a pump makes an ideal digital energizer.

A third embodiment of the invention, shown in FIGURE 3, utilizes a housing 100 which is identical to that employed in the embodiment of FIGURE 2, including an inlet pipe 102, an outlet pipe 104, a valve 106 and an outlet valve 108. A diaphragm 110 is mounted in exactly the same manner as the embodiment of FIGURE 2, however, it is not a laminated structure in this embodiment, nor need it be formed of a ferromagnetic material. The diaphragm is caused to vibrate by means of a laminated ferromagnetic arm 112 which is supported radially with respect to the pump housing 100 with one of its ends fixed to a support member 114 supported below the housing wall, and at the perimeter thereof. The arm 112 is aligned radially and its inner upper end carries a rod 116 which contacts the bottom of the diaphragm 110.

The arm 112 is wound with a coil 120 adjacent to its base 114. The arm 112 is formed of a laminated structure utilizing the same material as are employed in the laminated diaphragms of the privious embodiments. When current is applied to the coil 120, the magnetic field through the arm 112 causes one of the sides of the lamination to attempt to elongate and the other side to attempt to contract. The resultant bowing of the arm 112 causes the end 116 to force the diaphragm inwardly toward the pumping chamber volume, contracting the volume. A fluid flow is produced by this pump in the same manner as the previous embodiment.

The embodiment of FIGURE 4 also employs a plastic housing 130 which is generally similar to that of the embodiments of FIGURES 2 and 3. The housing 130 has an inlet pipe and outlet pipe 134, a pair of storage chambers 136 and 138, an inlet valve 140 connecting the storage chamber 136 to the pumping volume 142 and an outlet valve 144 connecting the pumping volume 142 to an outlet storage chamber 138.

This pump does not employ a diaphragm, but rather the lower end of the pumping line is closed off by a bellows arrangement formed of a plurality of short annular washers 148 formed of laminated bi-metal materials. The upper washers 148 are hinged at their upper ends to the bottom of the housing 130 by hinge means 150. Each of the washers are hinged to one another by pivotable joints 152. The lower ends of the lowest washer 148 are hinged to a bottom plate 154 by joints 156. The bottom plate is supported above a lower base plate 158 by coil spring means 160.

The bellows formed by the disc 48 is surrounded by a coil of magnetic wire 164 which has a pair of leads 166 which are adapted to be supplied with current from an appropriate electrical source. When current is applied to the coil 164, the magnetic field which passes through the discs 148 causes them all to bow in such a direction as to tend to raise their outer edges. This arrangement is achieved by alternating the materials in each washer of the bellows stack. For example, the top washer 148 may have the iron lamination on its outer side and the nickel on its inner side and the next lamination would have iron on its inner side and the nickel on its outer side. When the magnetic field from the coil 164 is removed, the spring 160 acts to retract the bellows into its normal extended position.

Having thus described my invention, I claim:

1. A fluid pump of the type described, comprising: a pumping compartment; an inlet passage and outlet passage communicating with said compartment; unidirectional valve means disposed in relation to the inlet and outlet connections so as to allow fluid flow only into the compartment from the inlet means and only out of the compartment from the outlet means; a closed bellows arrangement capable of varying the volume of the compartment as it expands and contracts forming at least a portion of the wall of said compartment, at least a portion of the walls of the bellows being formed of laminated, magnetostrictive rings; a wire coil magnetically coupled to at least a part of the said bellows member; and means for passing electric current through said coil so as to create a magnetic field, at least a portion of which passes through said rings, whereby variations in the electric current passing through said coil varies said magnetic field, so as to cause said magnetostrictive rings to expand and contract in order to vary the volume of the fluid compartment.

2. A fluid pump of the type described, comprising: a pumping compartment; an inlet passage and an outlet passage communicating with said compartment; unidirectional valve means disposed in relation to the inlet and outlet passages so as to allow fluid flow only into the compartment from the inlet means and only out of the compartment from the outlet means; and actuating magnetostrictive member consisting of a diaphragm formed of two laminated sheets having differing magnetostrictive properties and fixed at its outer perimeter so as to form a boundary of the pumping compartment so that changes in the position of the actuating member vary the volume of the compartment; a wire coil magnetically coupled to at least a portion of said actuating member; and means for passing electric current through said coil so as to create a magnetic field, at least a portion of which passes through said actuating member, whereby variations in the electric current flowing through said coil vary said magnetic field so as to vary the position of the actuating member and thereby vary the volume of the pumping compartment.

3. The pump of claim 2 wherein the pumping compartment comprises an annular chamber formed within an annular member, the wire coil is wrapped about the annular member so as to form an annular coil; and the actuating member arranged in an annular shape, and dividing the chamber into two annular halves.

References Cited

UNITED STATES PATENTS

| 2,317,166 | 4/1943 | Abrams | 103—1 |
| 2,542,075 | 2/1951 | Firth | 310—26 |
| 2,772,862 | 12/1956 | Van Suchtelin | 130—1 |
| 2,842,067 | 7/1958 | Stevens | 103—1 |
| 2,855,244 | 10/1958 | Camp | 103—1 |
| 2,876,427 | 3/1959 | Harris | 340—11 |
| 3,029,743 | 4/1962 | Johns | 103—1 |
| 3,107,630 | 10/1963 | Johnson | 103—1 |

ROBERT M. WALKER, *Primary Examiner.*

LAURENCE V. EFNER, *Examiner.*